United States Patent
Karp et al.

(10) Patent No.: US 10,766,242 B2
(45) Date of Patent: Sep. 8, 2020

(54) SYSTEM AND METHODS FOR FABRICATING A COMPONENT USING A CONSOLIDATING DEVICE

(71) Applicant: General Electric Company, Schenectady, NY (US)

(72) Inventors: Jason Harris Karp, Niskayuna, NY (US); Victor Petrovich Ostroverkhov, Ballston Lake, NY (US)

(73) Assignee: General Electric Company, Schenectady, NY (US)

(*) Notice: Subject to any disclaimer, the term of this patent is extended or adjusted under 35 U.S.C. 154(b) by 269 days.

(21) Appl. No.: 15/685,128

(22) Filed: Aug. 24, 2017

(65) Prior Publication Data

US 2019/0061333 A1 Feb. 28, 2019

(51) Int. Cl.
*B33Y 30/00* (2015.01)
*B22F 3/105* (2006.01)
(Continued)

(52) U.S. Cl.
CPC ............ *B33Y 30/00* (2014.12); *B22F 3/1055* (2013.01); *B33Y 50/02* (2014.12);
(Continued)

(58) Field of Classification Search
None
See application file for complete search history.

(56) References Cited

U.S. PATENT DOCUMENTS 5,754,291 A * 5/1998 Kain ............... G02B 21/02
356/318
5,841,566 A 11/1998 Minakuchi et al.
(Continued)

FOREIGN PATENT DOCUMENTS

CN 104493492 A 4/2015
CN 105033250 A 11/2015
(Continued)

OTHER PUBLICATIONS

International Search Report and Written Opinion, dated Nov. 28, 2018, for related International patent application No. PCT/US2018/041070.
(Continued)

*Primary Examiner* — Patricia L. Hailey
*Assistant Examiner* — Christopher Douglas Moody
(74) *Attorney, Agent, or Firm* — Armstrong Teasdale, LLP

(57) ABSTRACT

A consolidating device for an additive manufacturing system is provided. The consolidating device includes at least one first energy beam generator, at least one second energy beam generator, at least one first lens, at least one second lens, and at least one reflective element. The first energy beam generator is configured to generate a first energy beam. The second energy beam generator is configured to generate a second energy beam. The first lens has a first entrance pupil and is positioned between the first energy beam generator and the layer of material. The second lens has a second entrance pupil and is positioned between the first lens and the layer of material. The first entrance pupil and the second entrance pupil substantially overlap. The reflective element is positioned between the first lens and the second lens, and is configured to reflect the second energy beam onto the layer of material.

12 Claims, 6 Drawing Sheets

(51) Int. Cl.
  *B23K 26/06* (2014.01)
  *B23K 26/067* (2006.01)
  *B23K 26/70* (2014.01)
  *B23K 26/354* (2014.01)
  *B23K 26/342* (2014.01)
  *B33Y 50/02* (2015.01)
  *B33Y 10/00* (2015.01)
  *B33Y 80/00* (2015.01)

(52) U.S. Cl.
  CPC ..... *B22F 2003/1057* (2013.01); *B23K 26/067* (2013.01); *B23K 26/0643* (2013.01); *B23K 26/0648* (2013.01); *B23K 26/342* (2015.10); *B23K 26/354* (2015.10); *B23K 26/705* (2015.10); *B33Y 10/00* (2014.12); *B33Y 80/00* (2014.12)

(56) References Cited

U.S. PATENT DOCUMENTS

| | | | |
|---|---|---|---|
| 6,084,706 | A | 7/2000 | Tamkin et al. |
| 9,073,262 | B2 | 7/2015 | El-Siblani et al. |
| 9,114,478 | B2 | 8/2015 | Scott et al. |
| 9,533,375 | B2 | 1/2017 | Cho et al. |
| 9,561,623 | B2 | 2/2017 | El-Siblani et al. |
| 2008/0157412 | A1 | 7/2008 | Kihara et al. |
| 2008/0169587 | A1* | 7/2008 | Kihara ............... B22F 3/008 264/408 |
| 2009/0206065 | A1 | 8/2009 | Kruth et al. |
| 2014/0146316 | A1* | 5/2014 | Shi ............... G01N 21/53 356/342 |
| 2014/0263209 | A1 | 9/2014 | Burris et al. |
| 2015/0102531 | A1 | 4/2015 | El-Siblani et al. |
| 2015/0268099 | A1 | 9/2015 | Craig et al. |
| 2015/0346483 | A1 | 12/2015 | Ehrmann |
| 2015/0375456 | A1 | 12/2015 | Cheverton et al. |
| 2016/0067827 | A1 | 3/2016 | Zediker |
| 2016/0082662 | A1 | 3/2016 | Majer |
| 2016/0114431 | A1* | 4/2016 | Cheverton ........... B23K 26/342 219/76.1 |
| 2016/0136730 | A1 | 5/2016 | McMurtry et al. |
| 2016/0158889 | A1 | 6/2016 | Carter et al. |
| 2016/0179064 | A1 | 6/2016 | Arthur et al. |
| 2017/0008126 | A1 | 1/2017 | Long et al. |
| 2017/0021455 | A1 | 1/2017 | Dallarosa et al. |
| 2017/0050377 | A1 | 2/2017 | Gelbart |
| 2017/0090462 | A1 | 3/2017 | Dave et al. |
| 2017/0165751 | A1 | 6/2017 | Buller et al. |
| 2018/0126646 | A1* | 5/2018 | Zitelli ............... B29C 64/277 |

FOREIGN PATENT DOCUMENTS

| | | |
|---|---|---|
| CN | 103962557 B | 8/2016 |
| EP | 1935620 A2 | 12/2007 |
| IN | 201511304 P1 | 6/2016 |
| KR | 101682087 B1 | 12/2016 |

OTHER PUBLICATIONS

Schleifenbaum et al.,"Individualized production by means of high power Selective Laser Melting", CIRP Journal of Manufacturing Science and Technology, vol. 2, Issue: 3, pp. 161-169, 2010.

* cited by examiner

SYSTEM AND METHODS FOR FABRICATING A COMPONENT USING A CONSOLIDATING DEVICE

BACKGROUND

The field of the disclosure relates generally to additive manufacturing systems and, more particularly, to methods and systems for fabricating a component using a consolidating device including multiple energy beam generators sharing lenses.

At least some additive manufacturing systems involve the buildup of a particulate material to make a component. Such techniques facilitate producing complex components from expensive materials at a reduced cost and with improved manufacturing efficiency. At least some known additive manufacturing systems, such as Direct Metal Laser Melting (DMLM), Selective Laser Sintering (SLS), Direct Metal Laser Sintering (DMLS), and LaserCusing® systems fabricate components using a focused energy source, such as a laser device or an electron beam generator, a build platform, and a particulate, such as, without limitation, a powdered metal. (LaserCusing is a registered trademark of Concept Laser GmbH of Lichtenfels, Germany.) The focused energy source device melts the particulate material on the build platform in and around the area where the focused energy source is incident on the particulate material, resulting in at least one melt pool in a process known as "scanning." Each melt pool cools and consolidates to form at least a portion of the next layer in the build process.

In at least some DMLM systems, the laser beam or electron beam is directed across a layer of powder to sinter and melt the desired pattern in the layers of the powder bed. The typical scanning time for such systems per layer is in the range of 70-100 seconds. For certain parts, the build time requires days of processing time, at least partially due to the need to scan both simple, open areas and complex, contoured areas of a component. The time required to scan the component per layer prevents significant cost benefits associated with additive manufacturing from being fully realized. Additionally, at least some DMLM systems utilize a plurality of laser devices arranged to scan different portions of the component surface to decrease scanning times for each layer, but the energy and mechanical requirements of operating all of the laser devices decreases the cost savings and efficiency associated with the DMLM system.

BRIEF DESCRIPTION

In one aspect, a consolidating device for an additive manufacturing system is provided. The consolidating device includes at least one first energy beam generator, at least one second energy beam generator, at least one first lens, at least one second lens, and at least one reflective element. The first energy beam generator is configured to generate a first energy beam for forming a first melt pool in a layer of material. The second energy beam generator is configured to generate a second energy beam for forming a second melt pool in the layer of material. The first lens has a first entrance pupil and is positioned between the first energy beam generator and the layer of material, and is configured to receive the first energy beam. The second lens has a second entrance pupil and is positioned between the first lens and the layer of material. The second lens is configured to receive the first energy beam from the first lens, and the first entrance pupil and the second entrance pupil substantially overlap. The reflective element is positioned between the first lens and the second lens, and is configured to receive the second energy beam and to reflect the second energy beam through the second lens to be incident on the layer of material.

In another aspect, an additive manufacturing system is provided. The additive manufacturing system includes a material to be consolidated and a consolidating device. The consolidating device includes at least one first energy beam generator, at least one second energy beam generator, at least one first lens, at least one second lens, and at least one reflective element. The first energy beam generator is configured to generate a first energy beam for forming a first melt pool in a layer of material. The second energy beam generator is configured to generate a second energy beam for forming a second melt pool in the layer of material. The first lens has a first entrance pupil and is positioned between the first energy beam generator and the layer of material, and is configured to receive the first energy beam. The second lens has a second entrance pupil and is positioned between the first lens and the layer of material. The second lens is configured to receive the first energy beam from the first lens, and the first entrance pupil and the second entrance pupil substantially overlap. The reflective element is positioned between the first lens and the second lens, and is configured to receive the second energy beam and to reflect the second energy beam through the second lens to be incident on the layer of material.

In yet another aspect, a method of fabricating a component using an additive manufacturing system including a consolidating device is provided. The method includes depositing a material onto a surface. The method also includes emitting at least one first energy beam from at least one first energy beam device and at least one second energy beam from at least one second energy beam device. The method further includes receiving the first energy beam by at least one first lens and at least one second lens. The method includes reflecting the second energy beam through the second lens using at least one reflective element positioned between the first lens and a second lens. The method also includes generating at least one first melt pool in the layer of material with the first energy beam and at least one second melt pool in the layer of material with the second energy beam.

DRAWINGS

These and other features, aspects, and advantages of the present disclosure will become better understood when the following detailed description is read with reference to the accompanying drawings in which like characters represent like parts throughout the drawings, wherein.

Figure 1:
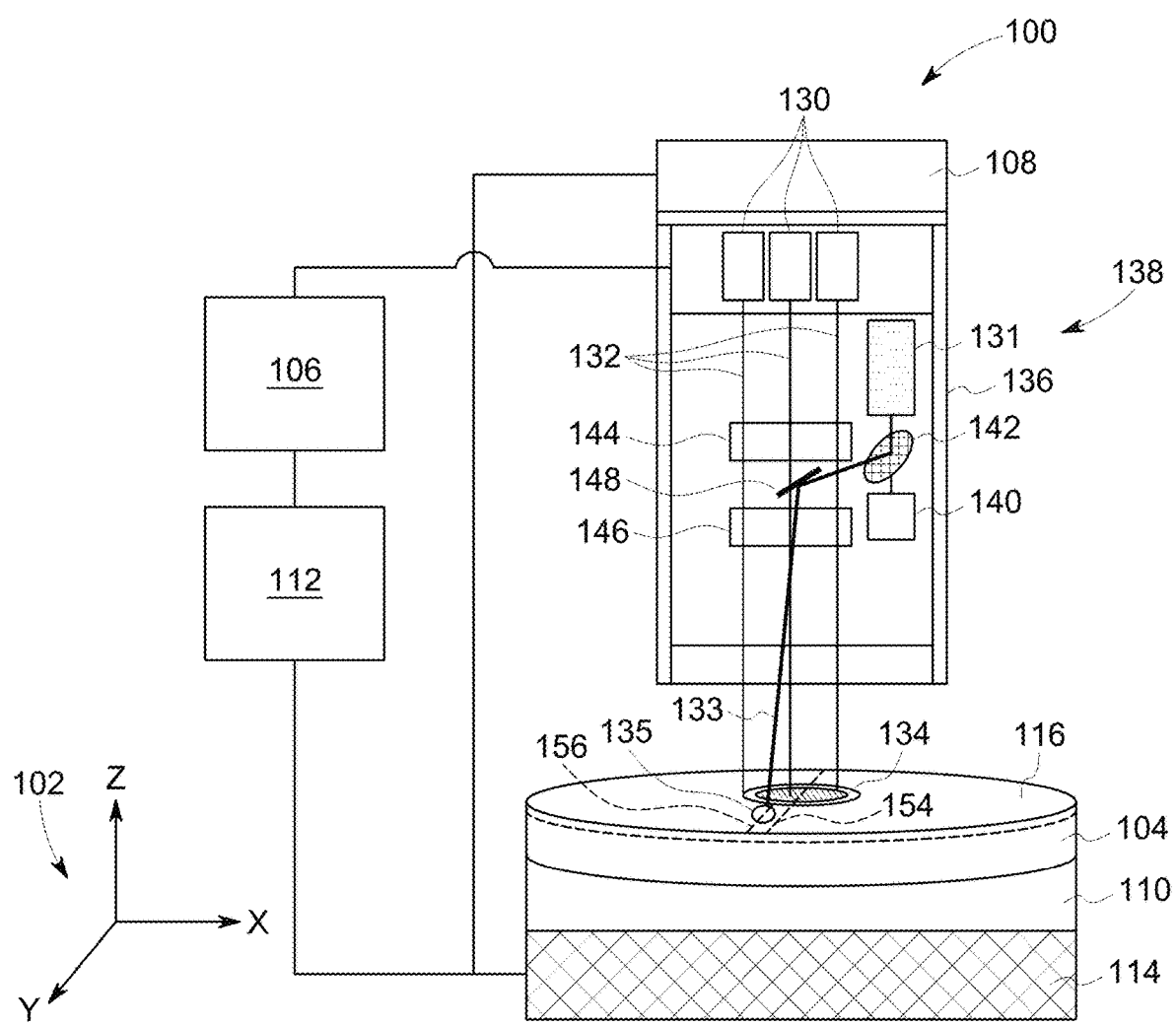
FIG. 1 is a schematic view of an additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. A value modified by the term "substantially overlapping", as used herein throughout the specification and claims, may be applied to any quantitative representation to indicate the quantitative representation overlays a referenced quantitative representation within a range of ninety-five percent of the referenced quantitative representation, and more particularly, within a range of ninety-nine percent of the referenced quantitative representation. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of an additive manufacturing system with a consolidating device described herein facilitate manipulation of a plurality of energy beams generated by separate energy beam generators using a shared set of lenses. Accordingly, systems and methods described herein facilitate rapid consolidation of large areas of a component using at least one first energy beam generator and consolidation of contoured and intricate portions of the component using a separate second energy beam generator, each energy beam being directed through at least a portion of a shared set of lenses. Specifically, an additive manufacturing system includes a consolidating device including at least one first, hatching, energy beam generator, a second, contouring, energy beam generator, a pair of telecentric lenses having substantially overlapping entrance pupils, and a reflective element positioned between the two lenses. At least one energy beam generated by the at least one first energy beam generator is received by, and travels through, the two lenses before being incident on a build layer of the component to facilitate consolidating large, open areas of the component. An energy beam generated by the second energy beam generator is reflected by the reflective element through the second lens before being incident on the build layer of the component to facilitate consolidating contoured and intricate areas of the component. Such consolidating devices can be used to, without limitation, increase coverage during each pass of the consolidating device across the component, reduce the number of passes the consolidating device must make during the additive manufacturing process, reduce manufacturing time, and reduce consolidating device size and complexity. Examples of the systems and methods may comprise a plurality of energy beam generators and a plurality of shared or overlapping lenses depending on the configuration, size and shape of a given system or systems, or the parts being additively manufactured, or the materials and energy sources being used.

In an optical system, an entrance pupil of a lens is the optical image of the lens' physical aperture stop, or opening through which light travels, as seen through the front of the lens. A telecentric lens is a compound lens that has its entrance pupil at infinity, making the lens object-space telecentric. Specifically, the telecentric lens' image magnification is independent of an object's distance or position within the field of view of the lens.

Additive manufacturing processes and systems for consolidating a material include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. Consolidation processes and systems may employ, for example, and without limitation, all forms of electromagnetic radiation, heating, sintering, melting, curing, binding, pressing, combining, integrating, fusing, unifying, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

FIG. 1 is a schematic view of an exemplary additive manufacturing system 100. A coordinate system 102 includes an x-axis, a y-axis, and a z-axis. In the exemplary embodiment, additive manufacturing system 100 includes a controller 106, a mounting system 108, a powder bed 110, an actuator system 112, a support structure 114, and a consolidating device 138, all of which are described below in more detail. In alternative embodiments, additive manufacturing system 100 may include any other components as enable additive manufacturing system 100 to function as described herein.

In the exemplary embodiment, consolidating device 138 including a plurality of first energy beam generators 130, a second energy beam generator 131, a first lens 144, a second lens 146, a mirror 142, and a reflective element 148. First energy beam generators 130 provide a high-intensity heat source configured to generate a first melt pool 134 (not shown to scale) in a powdered material using first energy beams 132. Second energy beam generator 131 provides a high-intensity heat source configured to generate a second melt pool 135 (not shown to scale) in a powdered material using a second energy beam 133. First energy beam generator 130 and second energy beam generator 131 are contained within a housing 136 that is coupled to a mounting system 108. Additive manufacturing system 100 also includes a computer control system, or controller 106. Mirror 142 is moved by a motor 140 to direct second energy beam 133. Mounting system 108 is moved by an actuator or an actuator system 112 that is configured to move mounting system 108 in an XY plane to cooperate with mirror 142 to facilitate fabricating a layer of a component 104 within additive manufacturing system 100. For example, and without limitation, mounting system 108 is pivoted about a central point, moved in a linear path, a curved path, and/or rotated to cover a portion of the powder on a powder bed 110 to facilitate directing first energy beam 132, and second energy beam 133 along the surface of component 104. Alternatively, housing 136, first energy beam 132, and second energy beam 133 are moved in any orientation and manner that enables additive manufacturing system 100 to function as described herein.

In the exemplary embodiment, powder bed 110 is mounted to a support structure 114, which is moved by actuator system 112. As described above with respect to mounting system 108, actuator system 112 is also configured to move support structure 114 in a Z direction (i.e., normal to a top surface of powder bed 110). In some embodiments, actuator system 112 is also configured to move support structure 114 in the XY plane. For example, and without limitation, in an alternative embodiment where housing 136 is stationary, actuator system 112 moves support structure 114 in the XY plane to direct first energy beam 132 of first energy beam generator 130 along first scan path 154 and to cooperate with motor 140 and mirror 142 to direct second energy beam 133 of second energy beam generator 131 along second scan path 156, each along powder bed 110. In the exemplary embodiment, actuator system 112 includes, for example, and without limitation, a linear motor(s), a hydraulic and/or pneumatic piston(s), a screw drive mechanism(s), and/or a conveyor system.

In the exemplary embodiment, additive manufacturing system 100 is operated to fabricate component 104 from a computer modeled representation of the 3D geometry of component 104. The computer modeled representation may be produced in a computer aided design (CAD) or similar file. The CAD file of component 104 is converted into a layer-by-layer format that includes a plurality of build parameters for each layer of component 104, for example, a build layer 116 of component 104. In the exemplary embodiment, component 104 is modeled in a desired orientation relative to the origin of the coordinate system used in additive manufacturing system 100. The geometry of component 104 is sliced into a stack of layers of a desired thickness, such that the geometry of each layer is an outline of the cross-section through component 104 at that particular layer location. First scan path 154 and second scan path 156 are generated across the geometry of a respective layer. The build parameters are applied along first scan path 154 and second scan path 156 to fabricate that layer of component 104 from the material used to construct component 104. The steps are repeated for each respective layer of component 104 geometry. Once the process is completed, an electronic computer build file (or files) is generated, including all of the layers. The build file is loaded into controller 106 of additive manufacturing system 100 to control the system during fabrication of each layer.

After the build file is loaded into controller 106, additive manufacturing system 100 is operated to generate component 104 by implementing the layer-by-layer manufacturing process, such as a direct metal laser melting method. The exemplary layer-by-layer additive manufacturing process does not use a pre-existing article as the precursor to the final component, rather the process produces component 104 from a raw material in a configurable form, such as a powder. For example, and without limitation, a steel component can be additively manufactured using a steel powder. Additive manufacturing system 100 enables fabrication of components, such as component 104, using a broad range of materials, for example, and without limitation, metals, ceramics, glass, and polymers.

Figure 2:
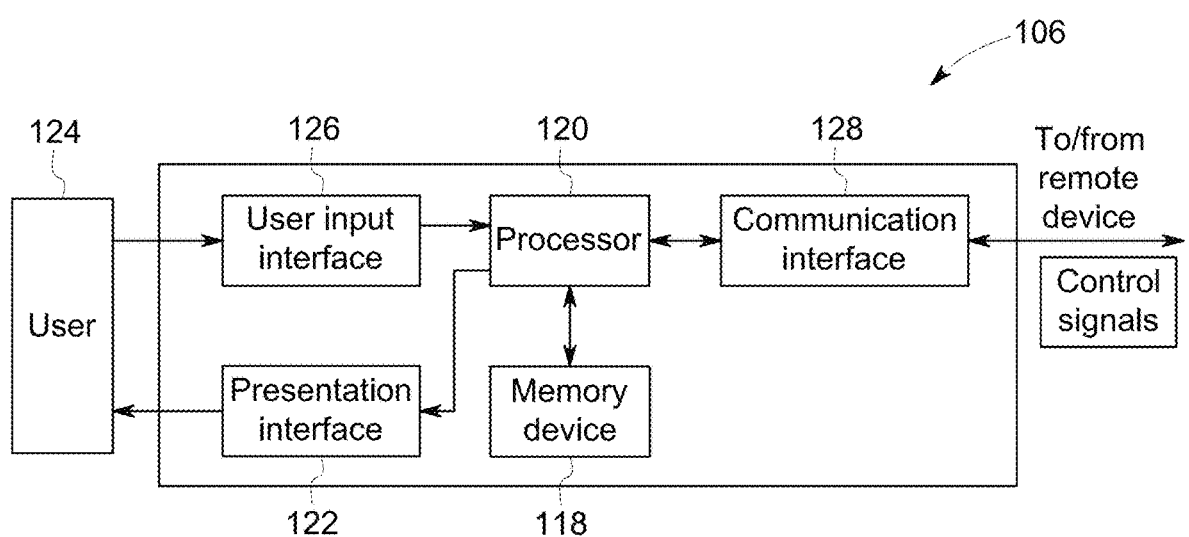
FIG. 2 is a block diagram of a controller that is used to operate the additive manufacturing system shown in FIG. 1.

FIG. 2 is a block diagram of controller 106 that is used to operate additive manufacturing system 100 (shown in FIG. 1). In the exemplary embodiment, controller 106 is any type of controller typically provided by a manufacturer of additive manufacturing system 100 to control operation of additive manufacturing system 100. Controller 106 executes operations to control the operation of additive manufacturing system 100 based at least partially on instructions from human operators. Controller 106 includes, for example, a 3D model of component 104 to be fabricated by additive manufacturing system 100. Operations executed by controller 106 include controlling power output of each first energy beam generator 130 (shown in FIG. 1) and second energy beam generator 131 (shown in FIG. 1), and adjusting mounting system 108 and/or support structure 114, via actuator system 112 (all shown in FIG. 1) to control the scanning velocity of first energy beam 132 and second energy beam 133. Controller 106 is also configured to control motor 140 to direct mirror 142 to further control the scanning velocity of second energy beam 133 within additive manufacturing system 100. In alternative embodiments, controller 106 may execute any operation that enables additive manufacturing system 100 to function as described herein.

In the exemplary embodiment, controller 106 includes a memory device 118 and a processor 120 coupled to memory device 118. Processor 120 may include one or more processing units, such as, without limitation, a multi-core configuration. Processor 120 is any type of processor that permits controller 106 to operate as described herein. In some embodiments, executable instructions are stored in memory device 118. Controller 106 is configurable to perform one or more operations described herein by programming processor 120. For example, processor 120 may be programmed by encoding an operation as one or more executable instructions and providing the executable instructions in memory device 118. In the exemplary embodiment, memory device 118 is one or more devices that enable storage and retrieval of information such as executable instructions or other data. Memory device 118 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 118 may be configured to store any type of data, including, without limitation, build parameters associated with component 104. In some embodiments, processor 120 removes or "purges" data from memory device 118 based on the age of the data. For example, processor 120 may overwrite previously recorded and stored data associated with a subsequent time or event. In addition, or alternatively, processor 120 may remove data that exceeds a predetermined time interval. In addition, memory device 118 includes, without limitation, sufficient data, algorithms, and commands to facilitate monitoring of build parameters and the geometric conditions of component 104 being fabricated by additive manufacturing system 100.

In some embodiments, controller 106 includes a presentation interface 122 coupled to processor 120. Presentation interface 122 presents information, such as the operating conditions of additive manufacturing system 100, to a user 124. In one embodiment, presentation interface 122 includes a display adapter (not shown) coupled to a display device (not shown), such as a cathode ray tube (CRT), a liquid crystal display (LCD), an organic LED (OLED) display, or an "electronic ink" display. In some embodiments, presentation interface 122 includes one or more display devices. In addition, or alternatively, presentation interface 122 includes an audio output device (not shown), for example, without limitation, an audio adapter or a speaker (not shown).

In some embodiments, controller 106 includes a user input interface 126. In the exemplary embodiment, user input interface 126 is coupled to processor 120 and receives input from user 124. User input interface 126 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 122 and user input interface 126.

In the exemplary embodiment, a communication interface 128 is coupled to processor 120 and is configured to be coupled in communication with one or more other devices, such as first energy beam generator 130, and to perform input and output operations with respect to such devices while performing as an input channel. For example, communication interface 128 may include, without limitation, a wired network adapter, a wireless network adapter, a mobile telecommunications adapter, a serial communication adapter, or a parallel communication adapter. Communication interface 128 may receive a data signal from or transmit a data signal to one or more remote devices. For example, in some embodiments, communication interface 128 of controller 106 may transmit/receive a data signal to/from actuator system 112.

Presentation interface 122 and communication interface 128 are both capable of providing information suitable for use with the methods described herein, such as, providing information to user 124 or processor 120. Accordingly, presentation interface 122 and communication interface 128 may be referred to as output devices. Similarly, user input interface 126 and communication interface 128 are capable of receiving information suitable for use with the methods described herein and may be referred to as input devices.

Figure 3:
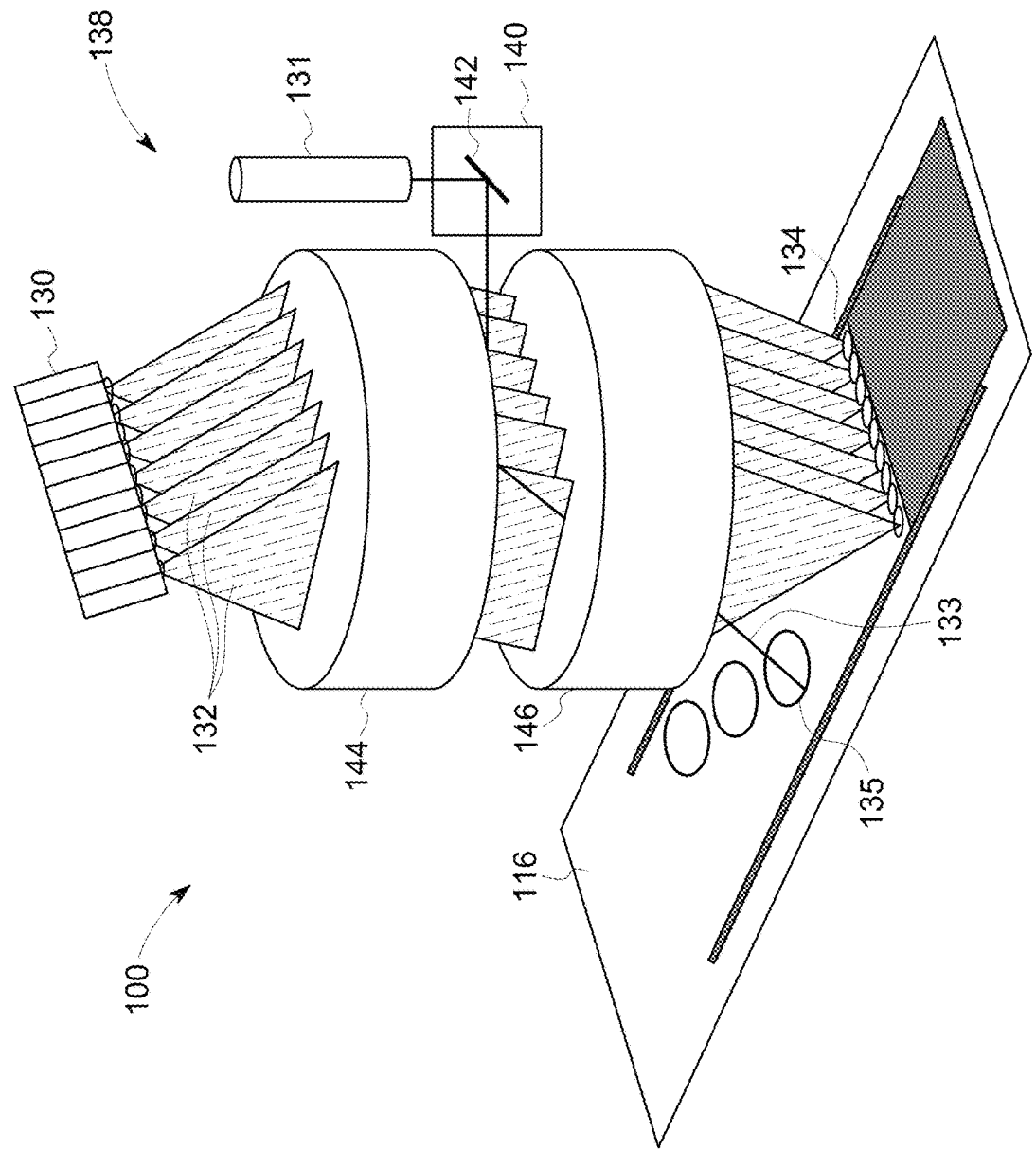
FIG. 3 is a partial perspective view of an exemplary consolidating device for use with the additive manufacturing system shown in FIG. 1.
Figure 4:
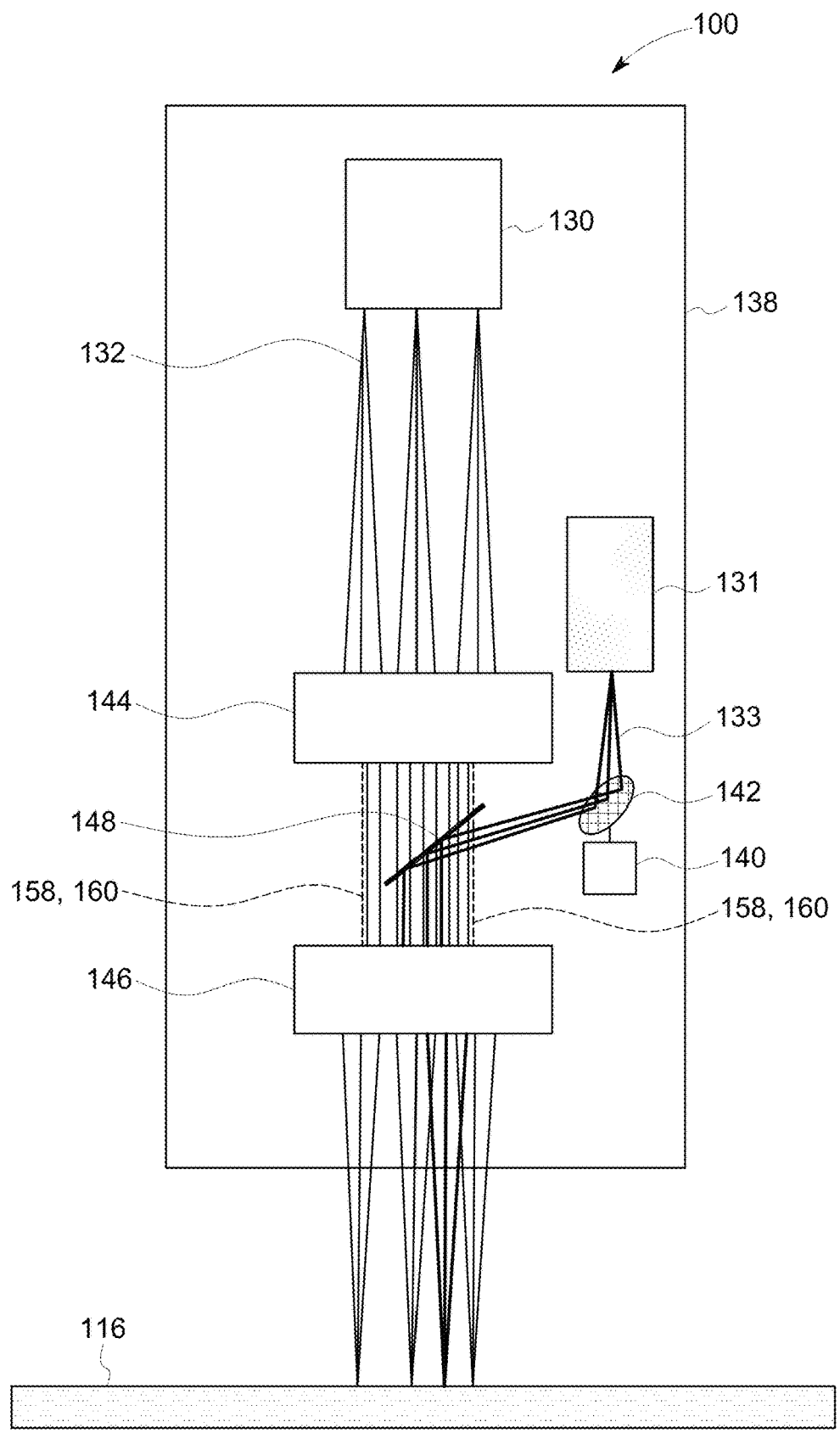
FIG. 4 is a schematic view of the consolidating device shown in FIG. 3.

FIG. 3 is a partial perspective view of consolidating device 138 of additive manufacturing system 100 (shown in FIG. 1). FIG. 4 is a schematic view of consolidating device 138 (shown in FIG. 3). In the exemplary embodiment, consolidating device 138 includes a plurality of first energy beam generators 130 configured to generate a plurality of first energy beams 132 for forming first melt pool 134 in build layer 116. Consolidating device 138 also includes second energy beam generator 131 configured to generate second energy beam 133 for forming second melt pool 135 in build layer 116. In the exemplary embodiment, the plurality of first energy beam generators 130 are arranged as an array and are hatching laser devices, and second energy beam generator 131 is a contouring laser device. In alternative embodiments, the plurality of first energy beam generators 130 and second energy beam generator 131 may include any type and quantity of energy beam generators as enables operation of additive manufacturing system 100 as described herein.

In the exemplary embodiment, first lens 144 has a first entrance pupil 158 and is positioned between first energy beam generator 130 and build layer 116, and is configured to receive first energy beam 132. Second lens 146 has a second entrance pupil 160 and is positioned between first lens 144 and build layer 116. Second lens 146 is configured to receive first energy beam 132 from first lens 144 and to focus first energy beam 132 on the surface of build layer 116 along first scan path 154. In the exemplary embodiment, first lens 144 and second lens 146 are telecentric lenses and are positioned such that first entrance pupil 158 substantially overlaps second entrance pupil 160. In alternative embodiments, first lens 144 and second lens 146 may be configured in any manner that facilitates operation of additive manufacturing system 100 as described herein.

In the exemplary embodiment, reflective element 148 is positioned between first lens 144 and second lens 146. Reflective element 148 is configured to receive second energy beam 133 and to reflect second energy beam 133 through second lens 146 to be incident on the surface of build layer 116. In the exemplary embodiment, reflective element 148 is a dichroic beam splitter configured to transmit light having a wavelength of 980 nm and to reflect light having a wavelength of 1070 nm. In alternative embodiments, reflective element 148 may be configured in any manner that facilitates operation of additive manufacturing system 100 as described herein.

In the exemplary embodiment, mirror 142 is a reflective element positioned between second energy beam generator 131 and reflective element 148 and is configured to receive second energy beam 133 from second energy beam generator 131. Motor 140 is controlled by controller 106 and is configured to move mirror 142 such that second energy beam 133 is reflected by mirror 142 to reflective element 148 and is then directed through second lens 146 to be incident along a predetermined path along powder bed 110, such as, for example, and without limitation, a linear and/or rotational second scan path 156. In the exemplary embodiment, the combination of motor 140 and mirror 142 forms a two-dimension scan galvanometer. Alternatively, motor 140 and mirror 142 may include a three-dimension (3D) scan galvanometer, dynamic focusing galvanometer, and/or any other method that may be used to deflect second energy beam 133 of second energy beam generator 131.

In the exemplary embodiment, first energy beam 132 travels from first energy beam generator 130 to first lens 144, passes through first lens 144, is received by second lens 146, and passes through second lens 146 to be incident on build layer 116. Using two separate unilaterally telecentric lenses, first lens 144 and second lens 146, with substantially overlapping entrance pupils (first entrance pupil 158 and second entrance pupil 160) provides an afocal plane at the midpoint between first lens 144 and second lens 146. Reflective element 148 is located at the afocal plane to introduce second energy beam 133 to second lens 146 and build layer 116 without necessitating a second set of lenses, all while permitting first energy beam 132 to function as described herein. In the exemplary embodiment, the plurality of first energy beam generators 130 generate a plurality of first energy beams 132 to facilitate consolidating large areas of component 104 during operation of additive manufacturing system 100, known as hatching. Second energy beam generator 131 generates second energy beam 133 which cooperates with mirror 142, reflective element 148, and second lens 146 to consolidate contours and complex areas of component 104 that the plurality of first energy beams 132 does not have the resolution to consolidate efficiently.

Figure 5:
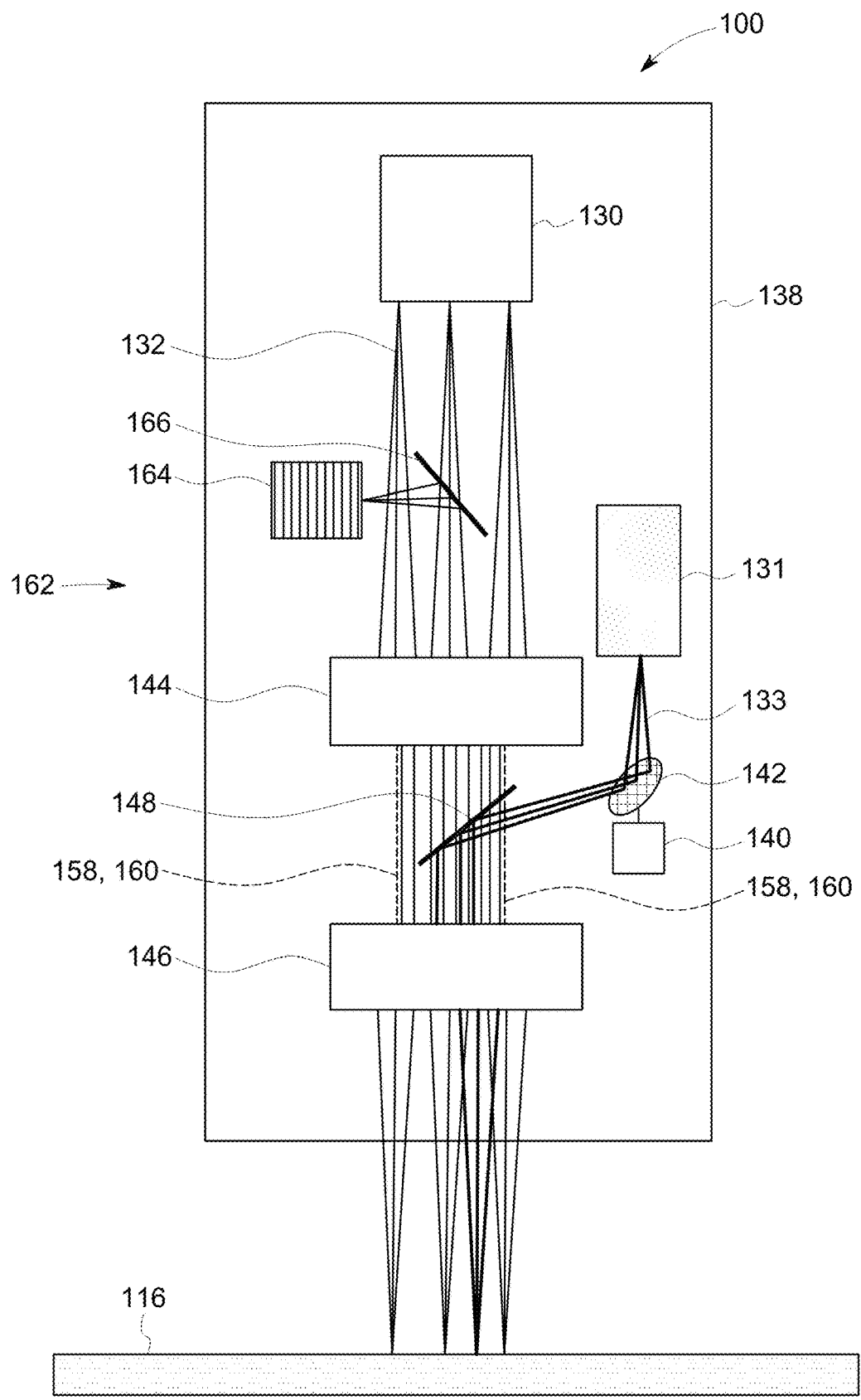
FIG. 5 is a schematic view of an alternative embodiment of the consolidating device shown in FIGS. 3 and 4 illustrating an exemplary energy beam sensing system.

FIG. 5 is a schematic view of an alternative embodiment of consolidating device 138 (shown in FIGS. 3-4) illustrating an energy beam sensing system 162. The embodiment shown in FIGS. 3 and 4 is substantially identical to the embodiment shown in FIG. 5, except for the presence of sensing system 162, including an energy beam detector 164 and a reflective sensor element 166. In the exemplary embodiment, energy beam detector 164 is configured to detect at least one of the at least one first energy beam 132 and second energy beam 133 reflected through second lens 146 and first lens 144 by build layer 116. In the exemplary embodiment, energy beam detector 164 is a photodiode sensor. In an alternative embodiment, energy beam detector 164 is an image sensor. In other alternative embodiments, energy beam detector 164 and reflective sensor element 166 may be configured in any manner that facilitates operation of additive manufacturing system 100 as described herein.

In the exemplary embodiment, reflective sensor element 166 is positioned between first lens 144 and the plurality of first energy beam generators 130. Reflective sensor element 166 is configured to transmit the plurality of first energy beams 132 generated by the plurality of first energy beam generators 130 and to reflect to energy beam detector 164 at least one of the plurality of first energy beams 132 reflected by build layer 116 and second energy beam 133 reflected by build layer 116. In alternative embodiments, reflective sensor element 166 may be configured in any manner that facilitates operation of additive manufacturing system 100 as described herein.

In the exemplary embodiment, at least a portion of at least one of the plurality of first energy beams 132 and second energy beam 133 is reflected by build layer 116 through second lens 146 and first lens 144 during operation of additive manufacturing system 100. The portions of the plurality of first energy beams 132 and second energy beam 133 that reach reflective sensor element 166 are reflected to energy beam detector 164 by reflective sensor element 166. Energy beam detector 164 is in communication with controller 106 which uses the information received from energy beam detector 164 to monitor the additive manufacturing process and to make adjustments to the process, including, without limitation, adjusting the power output of the plurality of first energy beam generators 130 and second energy beam generator 131. Additionally, down-beam process monitoring of the plurality of first energy beams 132 and second energy beam 133 by energy beam detector 164 facilitates improving process consistency and efficiency by identifying inconsistencies and unnecessary overlap within the areas the plurality of first energy beams 132 and second energy beam 133 are incident upon.

Figure 6:
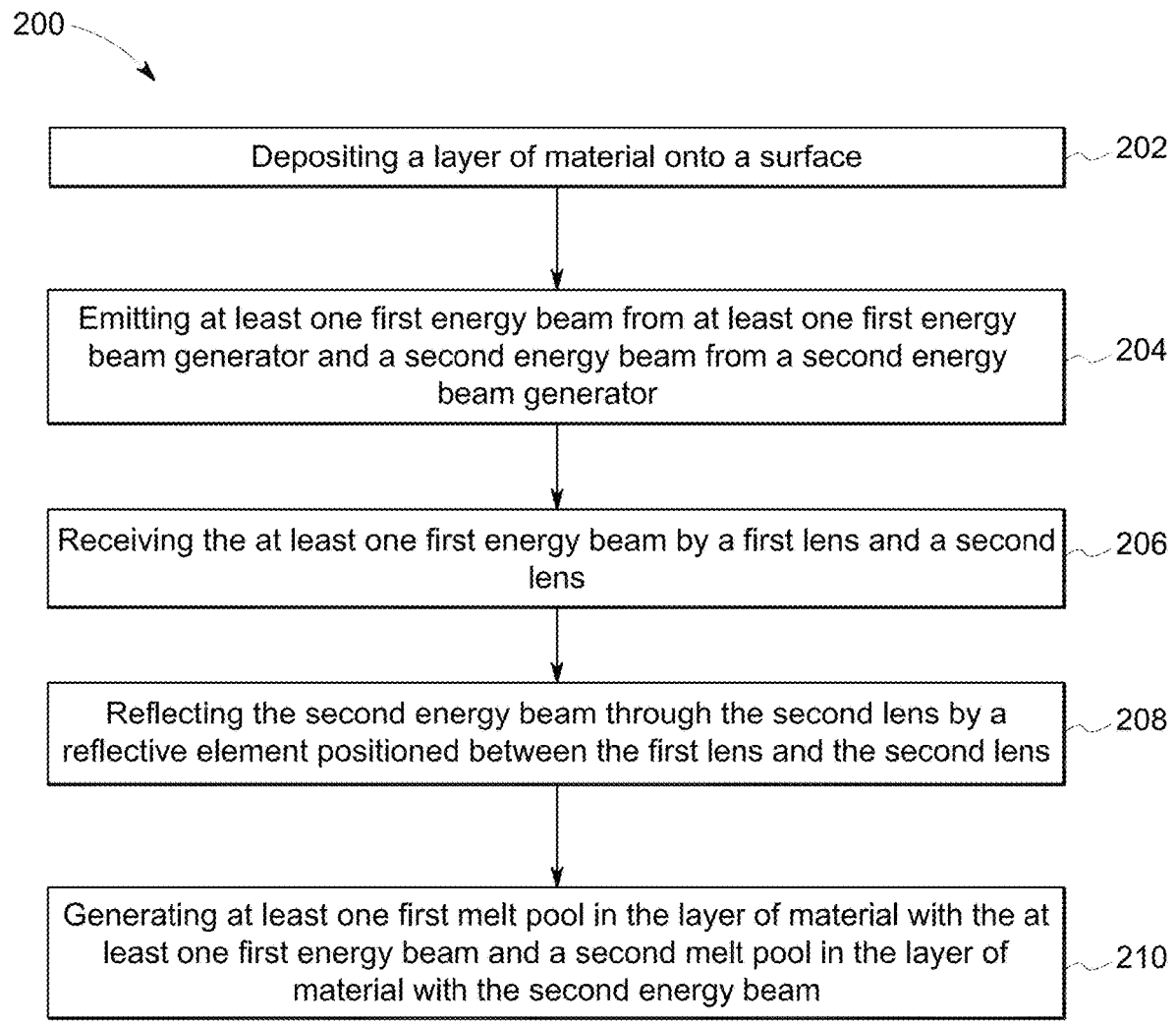
FIG. 6 is a flow chart illustrating a method for fabricating a component using the additive manufacturing system shown in FIG. 1.

FIG. 6 is a flow chart illustrating a method 200 for fabricating a component 104 using an additive manufacturing system 100 including a consolidating device 138. Referring to FIGS. 1-5, method 200 includes depositing 202 a layer of material onto a surface. Method 200 also includes emitting 204 at least one first energy beam 132 from at least one first energy beam generator 130 and a second energy beam 133 from a second energy beam generator 131. Method 200 further includes receiving 206 the at least one first energy beam 132 by a first lens 144 and a second lens 146. Method 200 includes reflecting 208 second energy beam 133 through second lens 146 using a reflective element 148 positioned between first lens 144 and second lens 146.

Finally, method 200 includes generating 210 at least one first melt pool 134 is a build layer 116 of the material with the at least one first energy beam 132 and a second melt pool 135 in build layer 116 of the material with second energy beam 133.

Embodiments of an additive manufacturing system with the consolidating device described herein facilitate manipulation of a plurality of energy beams generated by separate energy beam generators using a shared set of optical components. Accordingly, systems and methods described herein facilitate rapid consolidation of large areas of a component using at least one first energy generator and consolidation of contoured and intricate portions of the component using a separate second energy beam generator, each type of energy beam being directed through a shared set of lenses. Specifically, an additive manufacturing system includes a consolidating device including at least one first, hatching energy beam generator, a second, contouring energy beam generator, a pair of lenses, and a reflective element positioned between the two lenses. The at least one first energy beam generated by the at least one first energy beam generator is received by, and travels through, the two lenses before being incident on a build layer of the component to consolidate large, open areas of the component. The second energy beam generated by the second energy beam generator is reflected by the reflective element through the second lens before being incident on the build layer of the component to consolidate contoured and intricate areas of the component. Such consolidating devices can be used to, without limitation, increase coverage during each pass of the consolidating device over the component, reduced the number of passes the consolidating device must make during the additive manufacturing process, reduce manufacturing time, and reduce consolidating device size and complexity.

An exemplary technical effect of the methods, systems, and apparatus described herein includes at least one of: (a) operating multiple separate energy beam generators as part of a consolidating device using an at least partially shared optical system; (b) increasing consolidation coverage during each pass of the consolidating device; (b) reducing manufacturing time of the component; (c) reducing operating costs by requiring less manufacturing time and hardware.

Exemplary embodiments of an additive manufacturing system including a consolidating device including lenses shared by multiple separate energy beam generators are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with components as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A consolidating device for an additive manufacturing system, said consolidating device comprising:
    at least one first energy beam generator configured to generate a first energy beam for forming a first melt pool in a layer of material;
    at least one second energy beam generator configured to generate a second energy beam for forming a second melt pool in the layer of material;
    at least one first lens having a first entrance pupil, said first lens positioned between said first energy beam generator and the layer of material, wherein said first lens is a first unilaterally telecentric lens and is configured to receive the first energy beam;
    at least one second lens having a second entrance pupil, said second lens positioned between said first lens and the layer of material, wherein said second lens is a second unilaterally telecentric lens and is configured to receive the first energy beam from said first lens, wherein the first entrance pupil and the second entrance pupil substantially overlap, and wherein said first unilaterally telecentric lens and said second unilaterally telecentric lens create an afocal plane at a midpoint between said first unilaterally telecentric lens and said second unilaterally telecentric lens; and
    at least one reflective element positioned between said first lens and said second lens, said reflective element configured to receive the second energy beam and to reflect the second energy beam through said second lens to be incident on the layer of material.

2. The consolidating device in accordance with claim 1, wherein said first energy beam generator comprises an array of first hatching laser devices and said second energy beam generator comprises a contouring laser device.

3. The consolidating device in accordance with claim 1, wherein said reflective element comprises a dichroic beam splitter.

4. The consolidating device in accordance with claim 3, wherein said dichroic beam splitter is configured to transmit light having a wavelength of approximately 980 nanometers (nm) and to reflect light having a wavelength of approximately 1070 nm.

5. The consolidating device in accordance with claim 1 further comprising an energy beam sensing system comprising an energy beam detector configured to detect at least one of the first energy beam and the second energy beam after being reflected by the material.

6. The consolidating device in accordance with claim 5, wherein said energy beam detector comprises at least one of a photodiode and an image sensor.

7. An additive manufacturing system comprising:
a material to be consolidated; and
a consolidating device comprising:
at least one first energy beam generator configured to generate a first energy beam for forming a first melt pool in a layer of material;
at least one second energy beam generator configured to generate a second energy beam for forming a second melt pool in the layer of material;
at least one first lens having a first entrance pupil, said first lens positioned between said first energy beam generator and the layer of material, wherein said first lens is a first unilaterally telecentric lens and is configured to receive the first energy beam;
at least one second lens having a second entrance pupil, said second lens positioned between said first lens and the layer of material, wherein said second lens is a second unilaterally telecentric lens and is configured to receive the first energy beam from said first lens, wherein the first entrance pupil and the second entrance pupil substantially overlap, and wherein said first unilaterally telecentric lens and said second unilaterally telecentric lens create an afocal plane at a midpoint between said first unilaterally telecentric lens and said second unilaterally telecentric lens; and
at least one reflective element positioned between said first lens and said second lens, said reflective element configured to receive the second energy beam and to reflect the second energy beam through said second lens to be incident on the layer of material.

8. The additive manufacturing system of claim 7, wherein said first energy beam generator comprises an array of first hatching laser devices and said second energy beam generator comprises a contouring laser device.

9. The additive manufacturing system of claim 7, wherein said reflective element comprises a dichroic beam splitter.

10. The additive manufacturing system of claim 9, wherein said dichroic beam splitter is configured to transmit light having a wavelength of approximately 980 nanometers (nm) and to reflect light having a wavelength of approximately 1070 nm.

11. The additive manufacturing system of claim 8 further comprising an energy beam sensing system comprising an energy beam detector configured to detect at least one of first energy beam and the second energy beam after being reflected by the material.

12. The additive manufacturing system of claim 11, wherein said energy beam detector comprises at least one of a photodiode and an image sensor.

* * * * *